United States Patent [19]

Bender

[11] 4,242,057
[45] Dec. 30, 1980

[54] TANDEM LONG STROKE RECIPROCATING MUD PUMP ASSEMBLY

[76] Inventor: Emil A. Bender, 6625 Kane Way, Bakersfield, Calif. 93309

[21] Appl. No.: 78,185

[22] Filed: Sep. 24, 1979

Related U.S. Application Data

[63] Continuation-in-part of Ser. No. 12,729, Feb. 16, 1979, abandoned.

[51] Int. Cl.³ .............................................. F04B 17/00
[52] U.S. Cl. ..................................... 417/404; 91/306
[58] Field of Search ............... 417/404, 403, 417, 341; 91/306

[56] References Cited

U.S. PATENT DOCUMENTS

| Re. 25,873 | 10/1965 | Rutherford | 417/404 |
|---|---|---|---|
| 113,725 | 4/1871 | Baxter | 417/404 |
| 2,371,704 | 3/1945 | Nichols | 417/404 X |
| 2,887,955 | 5/1959 | Owen | 417/404 |
| 3,142,258 | 7/1964 | Rutherford | 417/404 |
| 3,164,325 | 1/1965 | Veum | 417/404 |
| 3,700,360 | 10/1972 | Shaddock | 417/404 |
| 3,775,028 | 11/1973 | Davis | 417/404 X |
| 3,790,310 | 2/1974 | Whelan | 417/404 |
| 3,846,049 | 11/1974 | Douglas | 417/404 |
| 4,028,014 | 6/1977 | Cocks | 417/403 |

FOREIGN PATENT DOCUMENTS

831383 3/1960 United Kingdom ............ 417/404

*Primary Examiner*—Billy S. Taylor
*Attorney, Agent, or Firm*—LeBlanc, Nolan, Shur & Nies

[57] ABSTRACT

A diverse fluid pump assembly including a pair of parallel, reciprocating piston-cylinder, motor-pump combinations. The motor-pump combinations are oppositely arranged so that one is pumping while the other is charging. Motor reversal is accomplished through a unique, hydraulically actuated spool valve which is slaved to the common piston rods of the respective, tandem motor-pump combinations. The invention is intended for use primarily as a mud pump for oil well servicing or drilling rigs. Principal components are easily broken down for replacement because of wear and/or size considerations. In a preferred embodiment, the hydraulically actuated spool valve is hydraulically slaved to the motors to effect motor reversal. A unique floating stuffing box is provided on the motor side of each combination which accomodates lateral rod shifting while maintaining a fluid tight seal. The spool valve operates smoothly through five distinct stages during motor reversal thus eliminating any need for a pulsation dampener.

13 Claims, 17 Drawing Figures

TANDEM LONG STROKE RECIPROCATING MUD PUMP ASSEMBLY

BACKGROUND OF THE INVENTION

This is a continuation-in-part of my prior application, Ser. No. 12,729, filed Feb. 16, 1979, now abandoned.

This invention relates generally to diverse fluid, tandem pumps and more particularly to a dual motor-pump combination assembly intended for use as a mud pump in oil field applications.

Over the last two decades, high speed duplex and triplex pumps operating at 100 to 150 RPM have been adopted. Such pumps are extremely expensive, costing in the neighborhood of $90,000 or better. These pumps convert rotary to reciprocating movement via massive gear cases, bull gears and pinions, heavy crank bearings, connecting rods, crossheads, pins, stuffing boxes, etc. and require complex, extensive lubrication systems. In addition to initial outlay cost, periodic maintenance is also very expensive.

Prior to the adoption of these duplex and triplex pumps, steam powered units were used to provide the motive power for oil field mud pumps. These steam powered rigs simply converted reciprocating movement to reciprocating movement. It is the basic concept of the instant invention to utilize the now well developed art of hydraulics and overlay the essential concept of the old steam powered rigs with hydraulic art concepts to thus provide a reciprocating to reciprocating movement mud pump of greatly simplified design which is far less costly in both initial outlay as well as maintenance. For example, it is presently estimated that a mud pump built in accordance with the principles and teachings of the present invention will cost only about one-half as much as a modern triplex pump having the same output characteristics.

An earlier attempt at a hydraulically driven tandem mud pump is disclosed in my earlier application Ser. No. 814,654 filed July 11, 1977 and entitled "Mud Pump Driven in Tandem by Hydraulic Pump", and now abandoned. The pump of that application included a double action reciprocating piston, hydraulically powered motor slaved by a common piston rod to a double action, reciprocating piston mud pump. The present invention provides a simplified improvement in the form of at least a pair of motor-pump conbinations, one arranged above the other.

The prior patented art is replete with examples of diverse fluid reciprocating piston pumps, mechanically slaved together by a common piston rod and including control means slaved to a trip assembly of one variety or another for reversing flow in the motor side of the pump. An early example of a steam powered water pump constructed according to these principles is found in U.S. Pat. No. 113,725 issued to W. Baxter, Jr. Other examples of such pumps are found in prior U.S. Pat. Nos. 2,371,704; RE 25,873; 3,540,348; 3,700,360; 3,775,028; 3,790,310; 3,846,049; 4,028,014; and United Kingdom Pat. No. 831,383.

The present invention provides a pump assembly made up of a pair of motor-pump conbinations acting in alternate fashion and including simplified valving and control means for reversing flow on the motor side of the pump assembly. Each motor-pump combination is an extremely long stroke unit to reduce the number of cycles per minute, when compared with conventional units, and thus greatly reduce wear. Components of the invention are easily and quickly broken down due to wear and/or size requirements or considerations.

SUMMARY OF THE INVENTION

Accordingly, it is a principal object of the invention to provide an improved reciprocating piston pump assembly including a pair of motor-pump combinations, particularly suited for use as a mud pump for oil well drilling or servicing operations.

It is another object of the invention to provide a dual, reciprocating piston motor-pump combination wherein motor reversal is accomplished through a hydraulically controlled spool valve hydraulically slaved to the motor-pump conbination or, alternatively, mechanically slaved to the piston rod of the motor-pump combination.

It is a further object of the invention to provide a dual, reciprocating piston motor-pump combination including a downstream, closed loop chamber arrangement having check valves therein for combining flow from both pumps and alternately charging both pumps.

It is yet another object of the invention to provide a dual, reciprocating piston motor-pump combination utilizing only one or, alternatively, only two sources of fluid under pressure for complete operation.

It is yet a further object of the invention to provide a dual, reciprocating piston motor-pump combination whose components are easily broken down for replacement due to wear and/or size considerations.

Still another object of the invention is to provide a mud pump for oil field work which is greatly simplified in construction, easy to maintain and requires an initial outlay of about half that mandated by present day mud pumps.

Further novel features and other objects of this invention will become apparent from the following detailed description, discussion and the appended claims taken in conjunction with the accompanying drawings.

BRIEF DESCRIPTION OF DRAWNGS

DESCRIPTION OF THE PREFERRED EMBODIMENT

The mud pump of this invention generally includes a base or skid platform upon which are mounted a mud pump, a hydraulic fluid reservoir, a primary hydraulic fluid pump, a tandem, dual motor-pump assembly made up of a pair of reciprocating piston, alternately actuated motor-pump combinations, a control structure including piston rod mounted collars, a shifting lever, a control valve and a hydraulically actuated spool valve for control flow to the motors of the pump, and a pump-downstream, closed-loop chamber having a check valve arrangement for combining flows from the two pumps into a single pump assembly outlet.

Referring now to the drawings by reference character FIGS. 1–5 illustrate one embodiment of the invention. A skid platform or base 10 is illustrated upon which is mounted a mud tank 12 and a reservoir 14 of hydraulic fluid. A prime mover 16, for example, a 350 HP V-8 diesel engine, drives a series (in this case, three) of hydraulic pumps 18, 18, 18 through a conventional PTO 20. Of course, hydraulic fluid is supplied to pumps 18, 18, 18 from hydraulic fluid intake 22 conduited to reservoir 14. Discharge from pumps 18, 18, 18 is directed through outlet line 24 to a spool valve assembly 26 (also shown in FIG. 5) which includes return line means 28 to direct spent hydraulic fluid back to reservoir 14.

From spool valve 26, hydraulic fluid under pressure is conveyed alternately through inlet lines 30, 32 (also shown in FIG. 2) to piggy-back arranged, motor-pump combinations 34, 36. Although these are shown mounted in piggy-back fashion, the combinations 34, 36 could be arranged side by side if desired.

The motor side of motor-pump combinations 34, 36 are illustrated at 38, 40 and the pump sides are indicated at 42, 44, respectively. Mud under pressure is conveyed by lines 46, 48 to a closed loop chamber assembly 50 (also shown in FIG. 4) which further includes a mud inlet line 52 at the bottom thereof and a pump assembly outlet line 54 at the top thereof. As in the case of all mud pumps, mud is fed to pumps 42, 44 under a relatively low head of pressure (about 15 to 30 psi in most applications) to eliminate the possibility of pump starvation during an intake or charging stroke. Mud is thus provided from a suction line 56 of mud tank 12 through a centrifugal pump 58, driven by a small prime mover 60 (such as a conventional 40 H.P. engine), to mud inlet line 52.

Figure 2:
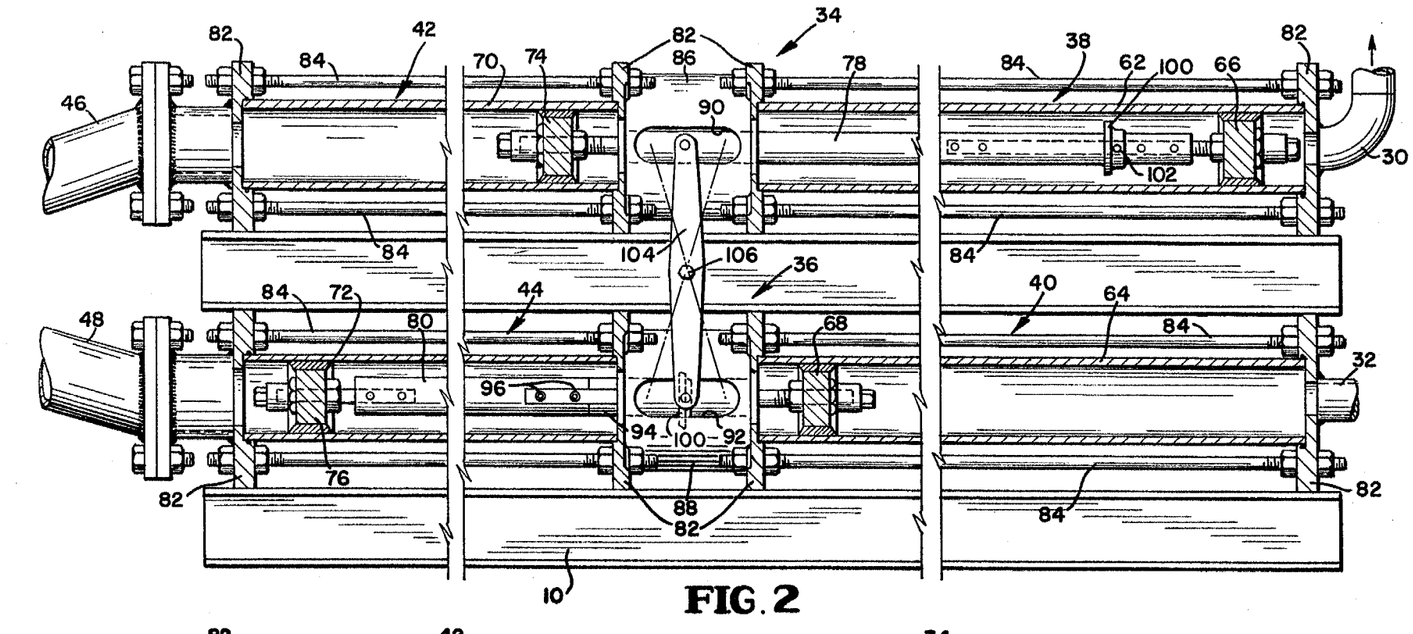
FIG. 2 is an elevation, section view of the principal dual motor-pump combinations of the invention.
Figure 3:
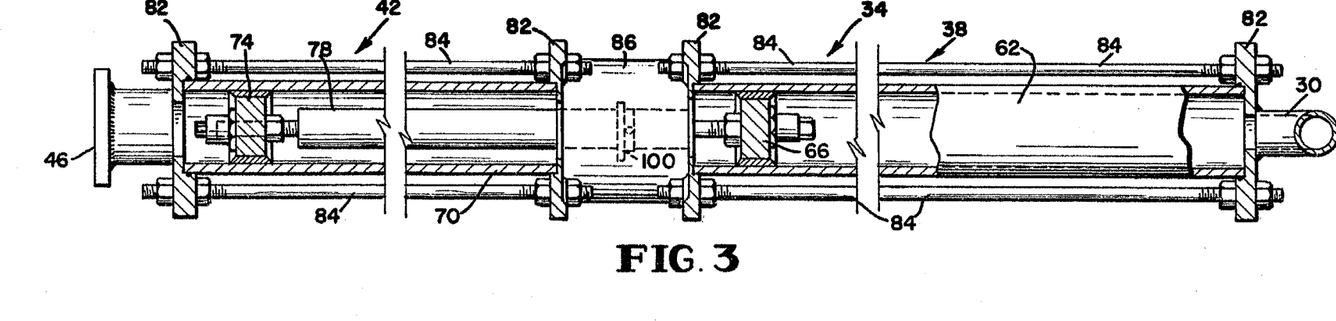
FIG. 3 is a top, partial section view of the invention as shown in FIG. 2.

Turning now to FIG. 2, the construction details of the motor-pump combinations will be discussed. Each motor 38, 40 includes a cylinder 62, 64 housing a single acting, reciprocating piston 66, 68 therein. Similarly, each pump 42, 44 includes a cylinder 70, 72 housing a single acting, reciprocating piston 74, 76 therein. The pistons 66, 74 of upper motor-pump 34 have a single piston rod 78 and the pistons 68, 76 of lower motor-pump 36 have a single piston rod 80. All motors and pumps are secured together by end block assemblies 82 and tie rods 84 so that, due to wear and/or size considerations, appropriate tie rods 84 are simply unbolted to change whatever component needs changing.

Centrally located between motor 38 and pump 42, and motor 40 and pump 44 are cylindrical spacers 86 and 88, respectively, each having hand holes 90, 92 therethrough, respectively, for reasons to be explained below.

Since the components of mud pumps 42, 44 will wear out far more readily than those of hydraulic motors 38, 40, a quick disconnect assembly is provided for each piston rod 78,80 so that the respective motor pistons 66,68 may be left in place while the left hand pump side of the invention is dismantled. Each piston rod 78, 80 includes a stub end 94 splined to its main rod and attached by means of a pair of set screws 96, 96, easily accessible through the respective hand holes 90,92. As further illustrated in FIG. 2, each of the four pistons are simply bolted onto their respective rods, also to facilitate ready replacement.

As set forth above, each motor-pump combination 34, 36 operates in alternating fashion so that one pump is pumping while the other is in a charging mode. Thus the two units operated in opposed, reciprocating fashion. This is illustrated in FIG. 2 wherein piston 66 is just receiving fluid under pressure from inlet line 30 while lower motor-pump combination 40 is about to be charged, with hydraulic fluid being pumped out of cylinder 64 by piston 68, through line 32 as mud under pressure from pump 58 enters line 48, against piston 76. It will be further noted that all four pistons are single acting pistons, having a wet side on their ends outboard of the mounting of their piston rods. This reduces the cost of the pistons in that only one wiping end is required (although two may be provided as in the case of conventional double acting pistons, to wipe the cylinders clean of debris). Additionally, this greatly simplifies parts replacement in that, for example, if mud pump components are to be replaced, this may be accomplished without any need of disturbing the hydraulic motor components of the assembly.

Figures 4, 5:
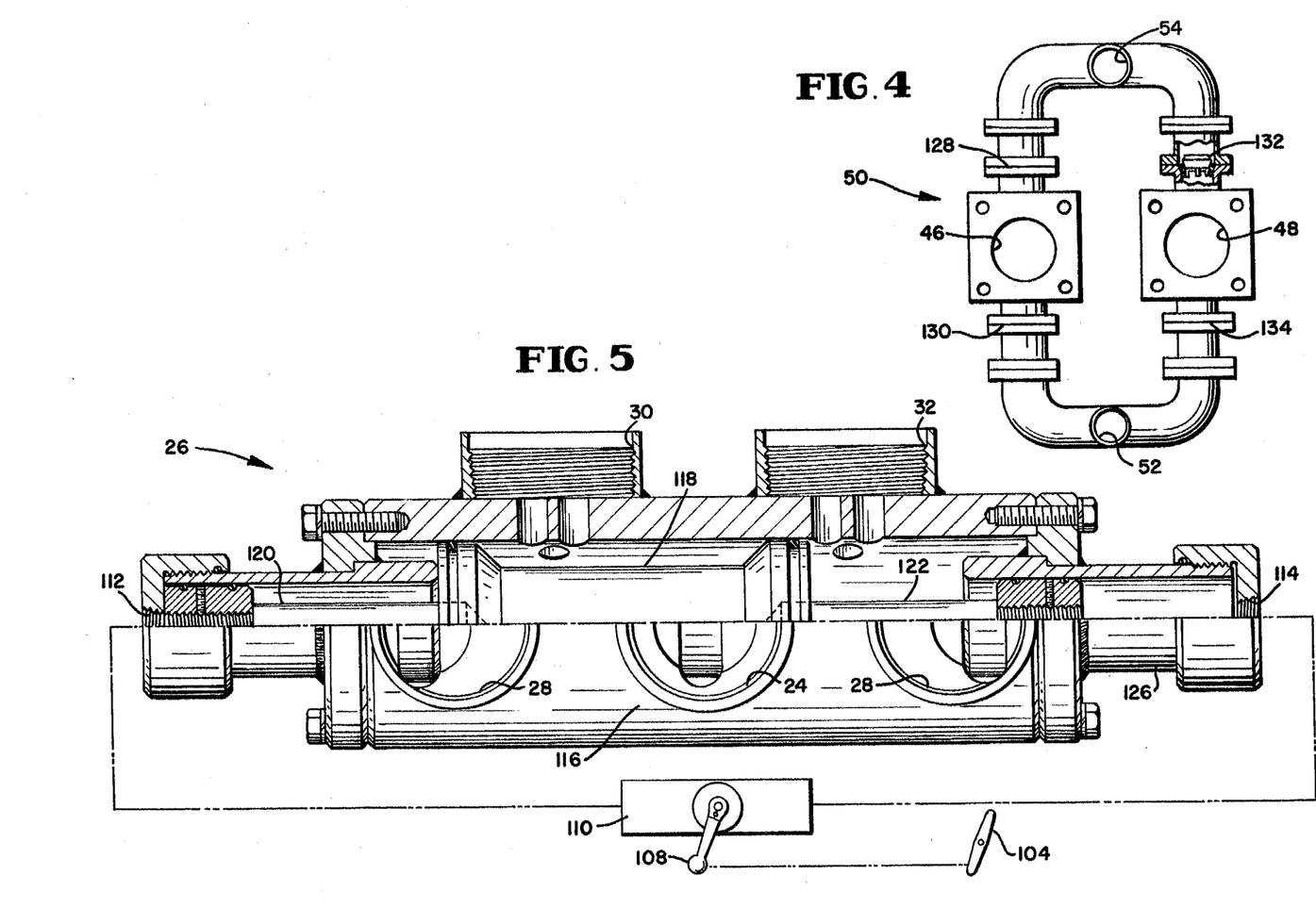
FIG. 4 is an end elevation view of the downstream, closed loop chamber for combining flow from the two reciprocating pumps of the invention.
FIG. 5 is a partial section, partial elevation, partial schematic view of the control components of the invention.

Referring now to FIGS. 2 and 5, the structure for accomplishing alternating pumping and charging of each motor-pump combination will be discussed in detail. Each piston rod 78, 80 has a trip collar 98, 100 thereon (adjustably set by means of a simple set screw 102) which alternately contact a shifting lever 104, pivotally mounted at 106 as illustrated in FIG. 2. Thus as piston rod 78 reaches its left hand limit of travel, in the sense of FIG. 2, collar 98 contacts lever 104, shifting the upper end thereof to the left. Similarly, when piston rod 80 reaches its left hand limit of travel in the sense of FIG. 2, collar 100 contacts lever 104 shifting its upper end to the right. This is also illustrated in FIG. 5.

Turning now to FIG. 5, shifting lever 104 is illustrated as being mechanically slaved to arm 108 of a hydraulic control valve 110. Valve 110 is a conventional shelf item, such as a Vickers rotary type directional valve. It is operable under very low pressures and may be provided with hydraulic fluid under pressure from the same source as that for lines 30, 32. Valve 110 and spool valve 26 may be arranged in piggy back fashion, if desired (not shown).

Spool valve 26 is hydraulically actuated by control valve 110; hydraulic fluid control lines therefor are shown in FIG. 5 in phantom lines and end at fittings 112, 114 at each end of chamber 116 of spool valve 26. Outlet 24 from pumps 18, 18, 18 enters centrally of chamber 116 and returns 28, 28 are at each end of chamber 116. Lines 30, 32 for motors 38, 40, respectively, are connected at the top of chamber 116. Spool 118 is moved by piston plunger assemblies 120, 122, under force of hydraulic fluid entering at 112, 114 respectively from control valve 110, between fixed limits of travel defined by casings 124, 126 for plungers 120, 122, respectively. As shown in FIG. 5, lever 104 has been shifted to the right so that fluid from control valve 110 is directed behind plunger 122 to move spool 118 to the left. Thus hydraulic fluid is directed from line 24 to line 30 and against piston 66 (FIG. 2). Simultaneously, fluid from cylinder 64 will be forced by mud pump 58 pressure against piston 76 through line 32 through chamber 116 and return line 28 (at the right in FIG. 5) to reservoir 14. Of course, the disposition of parts is simply reversed when motor 40 is actuated; accordingly, the details of the operation need not be further explained.

Turning now to FIG. 4, the construction and operation of closed loop chamber 50 will be considered. A series of four check valves 128, 130, 132, 134 are provided, one pair arranged above and below each pump outlet 46 and 48 as shown (one valve 132 is illustrated in section). With spool valve 26 disposed as illustrated in FIG. 5, mud is being pumped from line 46, opening check valve 128 and closing lines 130 and 132 so that mud is pumped through pump assembly outlet 54. Simultaneously, mud under a much lower head of pressure from pump 58 is directed through line 52 and past check valve 134 to line 48, against piston 76 to charge pump 44. When pump 42 is being charged, with spool 118 of spool valve 26 shifted to the right, mud is pumped through line 48, past check valve 132 and closing valves 128 and 134. Simultaneously, charging mud for pump 42 will come from line 52, past check valve 130 to line 46 and against piston 74.

Although a separate charging pump 58 is shown, it could be driven by any simple PTO means from prime mover 16, thus eliminating the need for an additional power plant.

An example of one embodiment of the invention can now be set forth. In a typical application, each cylinder is a little over 9 feet long so that each motor-pump combination has a stroke of 9 feet. With 7¾" diameter cylinders, 1500 psi in motors 38, 40 will require 300 gpm of hydraulic fluid which can be provided from a 300 HP prime mover. Thus 300 gpm at 1500 psi of mud will be provided and this is quite satisfactory for oil field operation. Of course, mud pump pressure is easily increased merely by reducing the size of cylinders 70, 72. For example with reduction of cylinders 70, 72 to 6 inches internal diameter, mud line pressure is easily increased to 3000 psi. If reduced to 5 inches, pressure would increase proportionally. Conversely, motor end pressure can easily be increased to 2000 psi for intermittent and extreme service needs.

Turning now to FIGS. 6-13, a preferred embodiment of the invention will be discussed in detail. A base 200 supports a mud tank 202 and a reservoir 204 of hydraulic fluid. A prime mover 206 (similar to diesel engine 16) drives a series of three hydraulic pumps 208, 208, 208 through a conventional PTO 210, fluid being supplied from reservoir 204 via intake 212. Pump discharge is directed through pressure line 214 to spool valve 216. (The internal structure of spool valve 216 is exactly the same as valve 26 but valve 216 is completely hydraulically actuated rather than partially mechanically tripped as will be explained below). Spool valve 216 includes return lines 218, 220 for directing spent hydraulic fluid back to reservoir 204.

Figure 6:
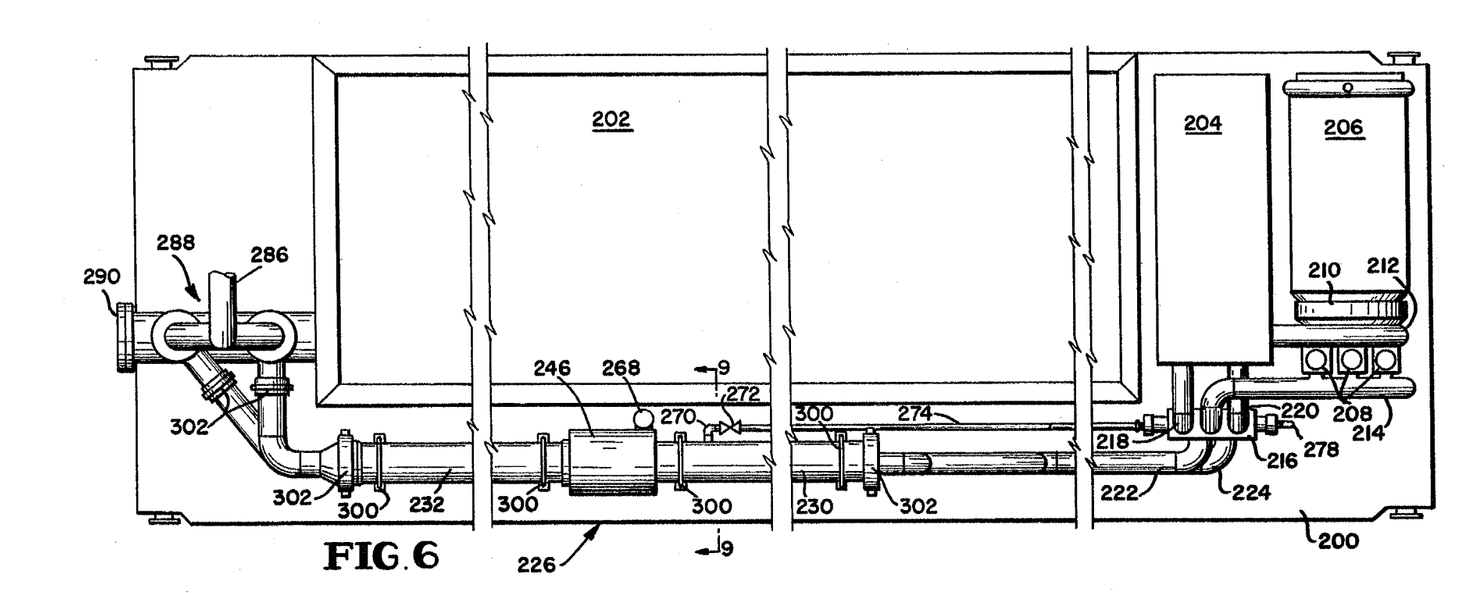
FIG. 6 is a top, plan, generally schematic view of a preferred embodiment of the invention.
Figure 7:
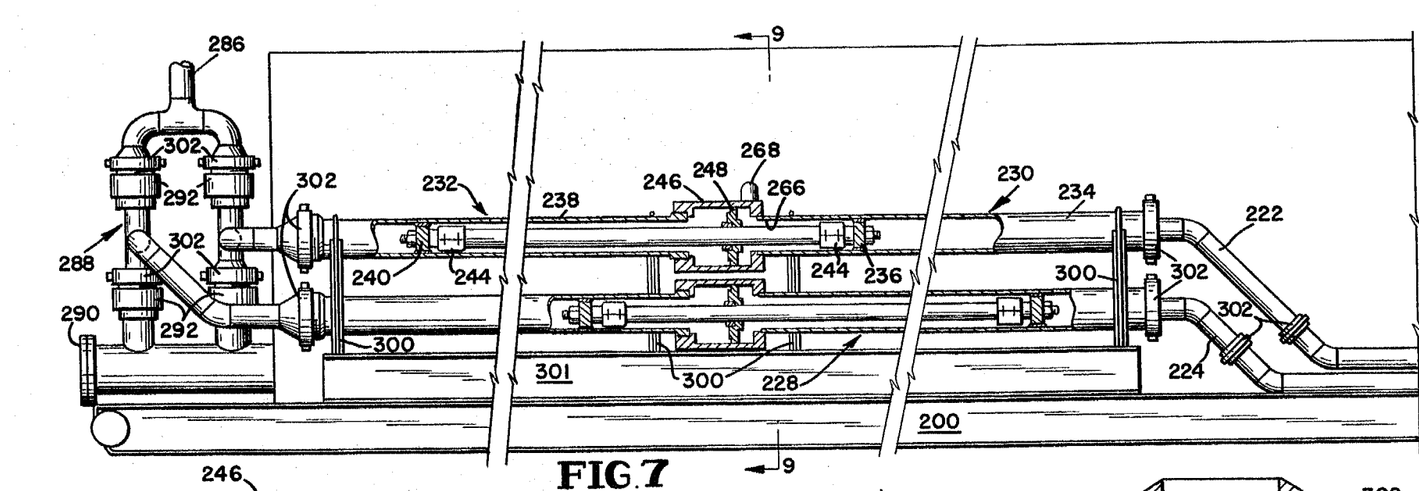
FIG. 7 is an elevation view of the embodiment shown in FIG. 6.

Hydraulic fluid under pressure is conveyed alternatively from spool valve 126 through inlet lines 222, 224 to piggy-back arranged, motor-pump combinations 226, 228, respectively. Since both motor-pumps are structured the same, only motor-pump 226 will be discussed in detail.

Motor-pump combination 226 includes a motor 230 and a pump 232. Motor 230 includes a cylinder 234 housing a double acting piston 236 (rather than single acting as in the first embodiment) and pump 232 includes a cylinder 238 housing a single acting piston 240. A single piston rod 242 interconnects pistons 236 and 240. A pair of clamping sleeve assemblies 244 are used to attach pistons 236 and 240 to piston rod 242. Each assembly 244 comprises two half sleeves easily bolted together. Thus, either piston 236 or 240 may be easily and quickly changed while rod 242 is saved for further use.

Figure 8:
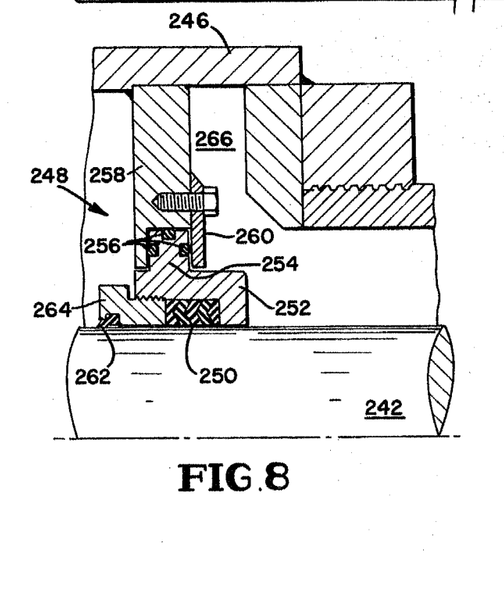
FIG. 8 is an enlarged scale, one-half section view of the novel stuffing box of the preferred embodiment of the invention.

A cylindrical spacer 246 joins motor 230 with pump 232. Unlike the first embodiment, spool valve 216 is completely hydraulically actuated or tripped. Thus, the downstream side of piston 236 (or to the left thereof in the sense of FIG. 7) is filled with low pressure, hydraulic fluid. The space is sealed at the left by a unique floating stuffing box 248, a half section of which is shown in FIG. 8. Chevron packing 250 is held by a retaining ring 252 having a circular extension 254 grooved to receive three O-ring seals 256, 256, 256 on the three faces thereof. A mounting ring 258 welded internally of spacer 246 holds extension 254 which is further clamped to ring 258 by a segmented circular plate clamp 260. (Plate clamp 260 is segmented in order to be fitted within spacer 246 during assembly of stuffing box 248.) A wiper 262 mounted in a collar 264 threaded to retaining ring 252 prevents any debris on rod 242 from entering motor 230. The O-ring seals 256 allow limited lateral shifting of rod 242 during reciprocation yet assure a fluid tight seal about rod 242.

Figure 9:
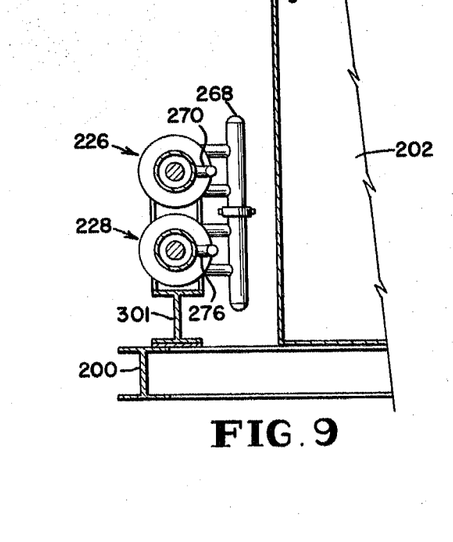
FIG. 9 is a section view taken along lines 9—9 of FIG. 6 and showing hydraulic porting from each motor utilized to shift the motor reversing spool valve.
Figure 11:
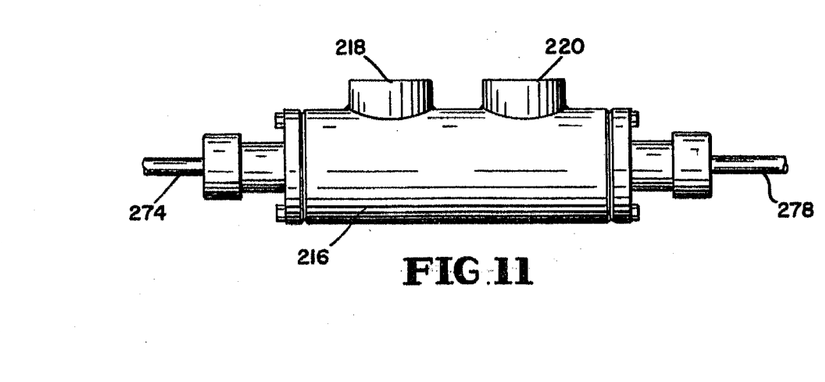
FIG. 11 is an elevation view of the spool valve and hydraulic control lines therefor.
Figure 12:
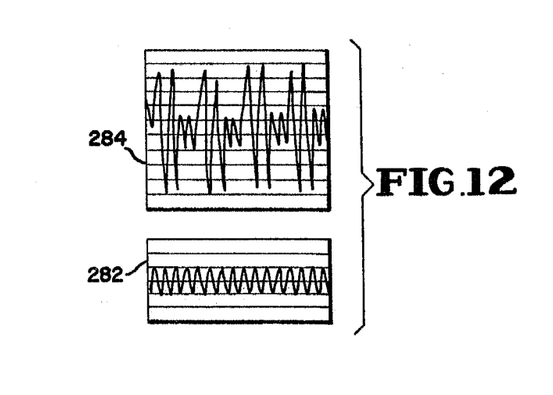
FIG. 12 is an illustration of two graphs, the top one illustrating undampened pulsations in a conventional triplex pump, the lower one showing undampened pulsations from use of the present invention.

Turning now to FIGS. 6, 9 and 11, the completely hydraulic actuation or tripping of spool valve 216 will be set forth. The space 266 between motor piston 236 and floating stuffing box 248 is filled with low pressure hydraulic fluid (150 psi or so) which is occasionally replenished by a small charging pump, as needed (not shown). The equivalent space in the lower motor is manifolded to space 266 at 268 so that during alternate reciprocation of the two pump-motors 226 and 228 fluid is moved between the two spaces. When piston 236 reaches its left hand limit of travel, control line port 270 (FIG. 9) is opened so that high pressure fluid (1500 psi or so) in cylinder 234 enters port 270. A check valve 272 (FIG. 6) assures only sufficient pressure passes into control line 274 to actuate spool valve 216 and thus reverse motor operation. A port 276 in the lower motor is connected through a similar check valve to control line 278 (FIG. 11) directed to the right side of spool valve 216 and, of course, motor reversal of the lower motor occurs alternately and in the same manner as motor reversal in the upper motor 230.

Figure 13A:
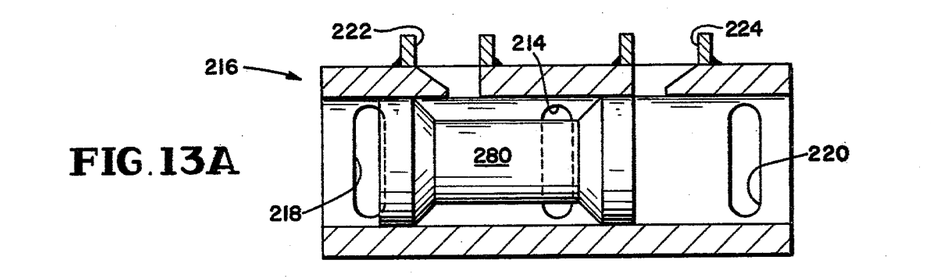
FIGS. 13A through 13E schematically illustrate the smooth, five stage action of the motor reversing spool valve of both embodiments of the invention.
Figure 13B:
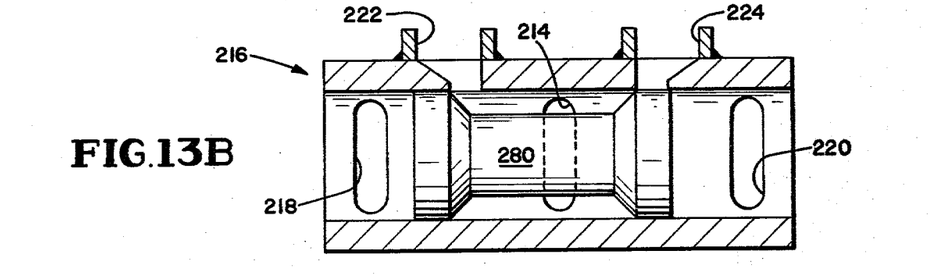
Figure 13C:
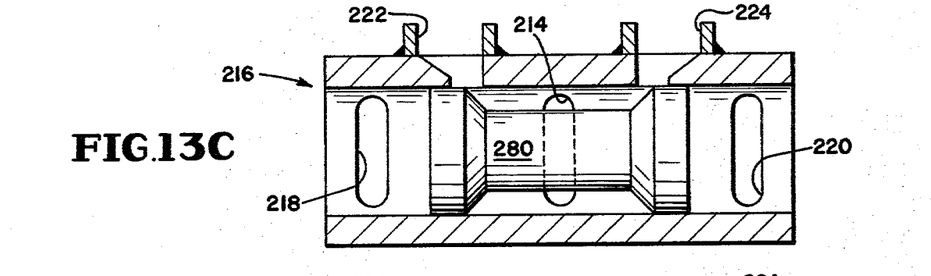
Figure 13D:
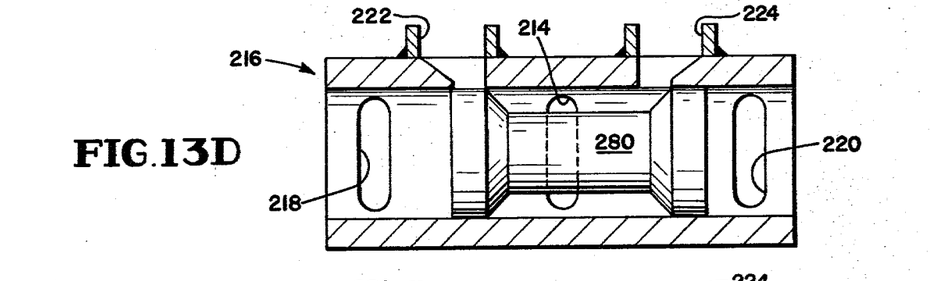
Figure 13E:
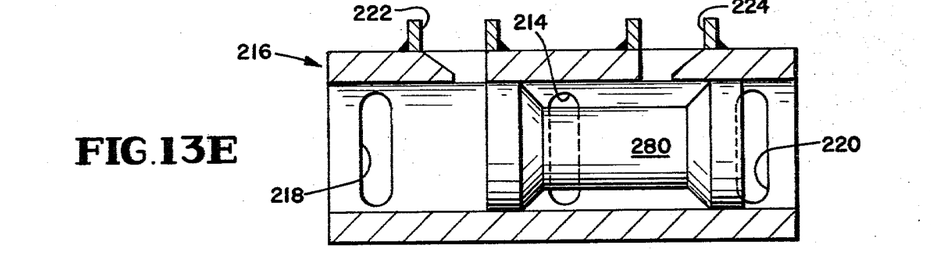

Turning now to FIGS. 13A through 13E, the smooth staging of valve 216 to effect motor reversal will be set forth. (Spool valve 26 operates the same way after being mechanically tripped). FIG. 13A shows spool 280 to the left, fluid under pressure being directed from line 214 to line 222 and motor 230. Simultaneously, spent fluid in the lower motor is passing through line 224 through valve 216 and return line 220 to reservoir 204. When port 270 is opened, as explained above, the plunger on the left side of valve 280 (not shown) will move to the right and move spool 280. When spool 280 reaches the position shown in FIG. 13B, return of spent fluid through line 220 is terminated. In FIG. 13C, it is seen that both return lines 218 and 220 are closed while high pressure fluid is directed to both motors through lines 222 and 224. Transition of power to the lower motor is thus initiated. When spool 280 reaches the position illustrated in FIG. 13D, line 222 is fully closed while line 224 is fully open to high pressure fluid; the return lines 218 and 220 are fully closed. Finally spool 280 reaches the position shown in FIG. 13E. Now spent fluid drains from motor 230 through line 222 and return line 218 while the lower motor is under full power through line 224 from line 214. When the lower motor piston reaches its limit of travel on a power stroke, spool 280 is reversed, or moved to the left through the stages shown in FIGS. 13E through 13A and upper motor 230 will be on a power stroke.

Spool valve 216 is fully balanced as shown so that movement of spool 280 therewithin is effected solely by control pressure in lines 274 and 278. The dampening effect created by spool valve 216 greatly reduces pulsations and shock in the entire pump assembly during reciprocation. As shown by lower graph 282 in FIG. 12, the reciprocating pump of this invention operates smoothly through a full cycle without need of any additional dampening means. In direct contradistinction thereto, upper graph 284 illustrates undampened operation in a conventional triplex mud pump. A dampener will smooth the operation of a triplex pump to the conditions shown in graph 282 but such dampeners cost in excess of $5,000.

Figure 1:
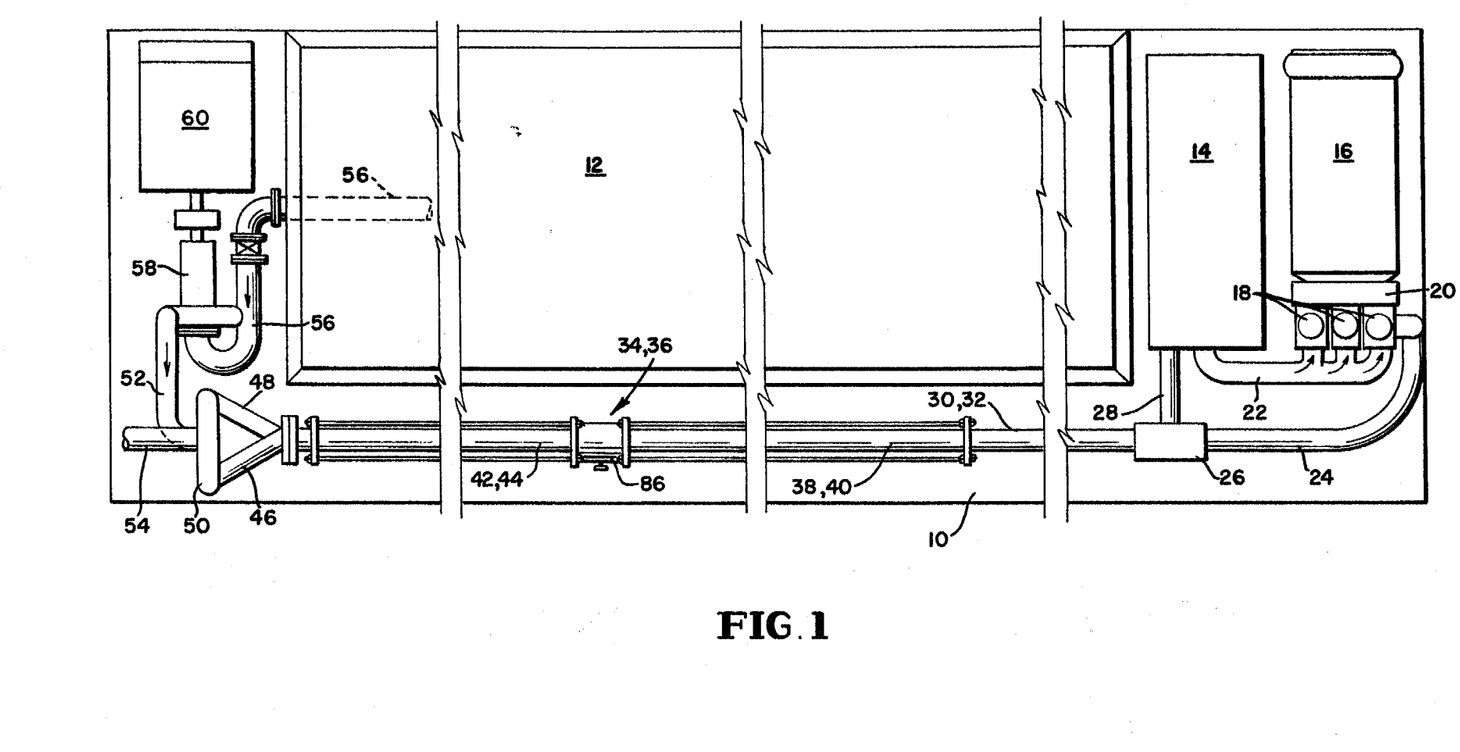
FIG. 1 is a top, plan, generally schematic view of the overall invention including additional primary and charging pumps, a mud tank and a hydraulic fluid reservoir.
Figure 10:
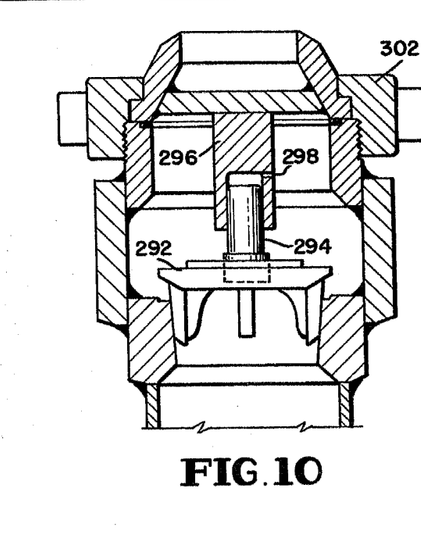
FIG. 10 is an enlarged scale section view of one of the mud valves in the downstream, closed loop chamber for combining flows from the two mud pumps of the preferred embodiment.

Turning now to FIGS. 1 and 10, mud is combined and fed steadily to a mud outlet line 286 by a valved, closed looped chamber 288. Chamber 288 operates the same way as chamber 50 except that the need for a charging pump 58 is eliminated for most applications. If charging pressure for the spent mud pumps should be desired, either an accumulator (not shown) may be attached at 290 or a charging pump 58 could be provided.

One of the 4 check valves 292 for chamber 288 is shown in FIG. 10. The valve includes a guide stem 294 retained in a guide sleeve 296 which is ported at 298 to prevent fluid pressure lock.

The entire assembly is held together by less complicated means than that disclosed in the first embodiment. The four cylinders and spacing cylinders making up the motor-pump combinations 228 and 230 are clamped together by four inverted U-bolt and spacer assemblies 300 on an I-beam 301. The tie bolt construction of the first embodiment is replaced by simple hammer unions 302. (Hammer unions 302 may be provided at the junctions of the respective motor-pump cylinder with each central spacer cylinder although this is not illustrated.) The internal configuration of a typical hammer union 302 is best illustrated in FIG. 10.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A tandem reciprocating piston pump assembly having at least a pair of motor-pump combinations, each of said motors comprising a first cylinder, a first source of fluid under pressure, a first piston reciprocable in said cylinder, and means for introducing said first fluid to one side only of said first piston; each of said pair of driven pumps comprising a second cylinder, a second piston reciprocable in said second cylinder, a second source of fluid under pressure, and means for introducing said second fluid to one side only of said second piston; said assembly further comprising a pair of piston rods, arranged common to and interconnecting the pistons of each motor-pump combination, trip means on said piston rods, and control means actuated by said trip means for alternately introducing said first fluid under pressure to said motors, said first and second means for introducing said first and second fluids to one side of said first and second cylinders, respectively, comprising first and second conduiting connected to said motor and pump cylinders, respectively, on ends thereof opposite the mounting of the respective pistons on their common piston rods, said two motor-pump combinations being arranged essentially parallel one another and for opposed pumping action in that one motor-pump assembly is in a pumping mode while the other is in a charging mode, with said second fluid entering the second cylinder thereof, said trip means comprising a pair of collars, one to each piston, and shifting lever means connected to said control means and alternately shifted by said collars to thus reverse said introduction of said fluid to said motors.

2. The pump assembly claimed in claim 1 wherein each of said first and second cylinders further comprises a pair of end block assemblies for mounting said each cylinder and a plurality of tie bolt means for securing said end block assemblies and cylinder together whereby said cylinder may be readily replaced by a similar cylinder due to wear, or a different sized cylinder to change flow capacity of the cylinder.

3. The pump assembly claimed in claim 1 wherein said control means comprise a balanced spool valve assembly and a fluid control valve for said spool valve, said spool valve further comprising a chamber, inlet means thereon for said first fluid under pressure, a pair of outlet means for the respective said first cylinders, a pair of return means for directing said first fluid back to its source, a spool valve in said chamber having two fixed limits of travel, the first being to direct said first fluid to one of said first cylinders and fluid from the other of said first cylinders through one of said pair of return means, the other limit of travel being to direct said first fluid to said other of said first cylinders and fluid from said one of said first cylinders to the other of said pair of return means, shifting means for moving said spool valve to its respective fixed limits of travel, and linking means interconnecting said fluid control valve and said shifting lever means for thus actuating said spool valve shifting means.

4. The pump assembly claimed in claim 3 wherein said spool valve shifting means comprise a pair of fluid pressure actuated plungers mounted on the respective ends of said spool valve assembly chamber and arranged to be alternately actuated by said fluid control valve to shift said spool valve between its fixed limits of travel.

5. A tandem reciprocating piston pump assembly having at least a pair of motor-pump combinations, each of said motors comprising: a first cylinder, a first source of fluid under pressure, a first piston reciprocable in said cylinder and means for introducing said first fluid to one side of said first piston; each of said driven pumps comprising a second cylinder, a second piston reciprocable in said second cylinder, a second source of fluid, and means for introducing said second fluid to one side only of said second piston; said assembly further comprising a pair of piston rods, arranged common to and interconnecting the pistons of each motor-pump combination; means defining closed chambers containing a quantity of control fluid within said first cylinders on sides of said first pistons opposite said one side thereof; and control means operated in response to said first source of fluid under pressure for alternately introducing said first fluid under pressure to said motors, said first and second means for introducing said first and second fluids to said first and second cylinders, respectively, comprising first and second conduiting connected to said motor and pump cylinders, respectively, on ends thereof opposite the mounting of the respective pistons on their common piston rods, said control chambers being manifolded together by manifold conduit means, a pair of port means connected to said control means and being defined through the walls of each first cylinder, said port means being alternately communicated to said first fluid under pressure.

6. The pump assembly as claimed in claim 5 wherein each of said first and second cylinders further comprises a plurality of inverted U-bolt and spacer assemblies for mounting said pair of motor-pump combinations in piggy-back fashion, one above the other, and support means therefor, located beneath the lowermost motor-pump combination.

7. The pump assembly as claimed in claim 5 wherein said control means comprise a balanced spool valve comprising a chamber, inlet means thereon for said first fluid under pressure, a pair of outlet means for the respective said first cylinders, a pair of return means for directing said first fluid back to its source, a spool valve in said chamber having two fixed limits of travel, the first being to direct said first fluid to one of said first cylinders and fluid from the other of said first cylinders through one of said pair of return means, the other limit of travel being to direct said first fluid to said other of said first cylinders and fluid from said one of said first cylinders to the other of said pair of return means, and shifting means for moving said spool valve to its respective fixed limits of travel, said port means being connected to said shifting means.

8. The pump assembly as claimed in claim 7 wherein said shifting means comprise a pair of fluid pressure actuated plungers mounted on the respective ends of said spool valve and arranged to be alternately actuated from said port means to shift said spool valve between its fixed limits of travel.

9. The pump assembly claimed in claims 1 or 5 wherein each of said first and second pistons includes means for readily detachably mounting said each first and second piston onto its respective piston rod whereby said each piston may be readily replaced for wear and/or size purposes.

10. The pump assembly claimed in claims 1 or 5, further comprising an outlet valve assembly in the form of a vertically arranged, closed loop chamber, said second fluid source being connected to the bottom of said loop chamber, a pump assembly outlet connected to the top of said loop chamber, two pairs of check valves arranged within said loop chamber and a pair of conduits for each pump cylinder connected to said loop chamber between a respective pair of check valves, whereby when one of said motor-pump combinations is in a pumping mode, said second fluid is being forced through one of said conduits past one of said check valves to said pump assembly outlet, one of said means for introducing said second fluid to one side only of said second piston thus comprising said closed loop chamber, another of said check valves and the other of said conduits to the other of said motor-pump combinations, which is in a charging mode.

11. The pump assembly claimed in claim 5 wherein each of said control chambers further comprises a floating stuffing box about said piston rod to define an end of said control chamber, said floating stuffing box comprising a fixed mounting ring at an end of said first cylinder adjacent said second cylinder, a wiper and retainer ring assembly about said piston rod, concentrically inwardly of said mounting ring, and sealing means between said mounting ring and said retainer ring assembly for assuring a fluid tight seal therebetween while allowing lateral shifting of said piston rod as it reciprocates through said wiper and retainer ring assembly.

12. The pump assembly as claimed in claim 11 wherein said sealing means comprise a female, grooved seat formed in the inward periphery of said mounting ring, a mating, male extension received within said female seat and a plurality of O-ring seals located between said seat and extension, said seat and extension being relatively dimensioned so that said extension may move slightly within said seat while said O-ring seals maintain a fluid tight sealing relationship therebetween.

13. The pump assembly as claimed in claim 5 wherein each of said first and second cylinders further comprises threaded hammer union means for mountng said pump in assembly whereby said cylinder may be readily replaced by a similar cylinder due to wear or a different sized cylinder to change flow capacity of the cylinder.

* * * * *